(No Model.)  C. C. STARKE.  2 Sheets—Sheet 1.
STOCK CAR.
No. 245,883. Patented Aug. 16, 1881.
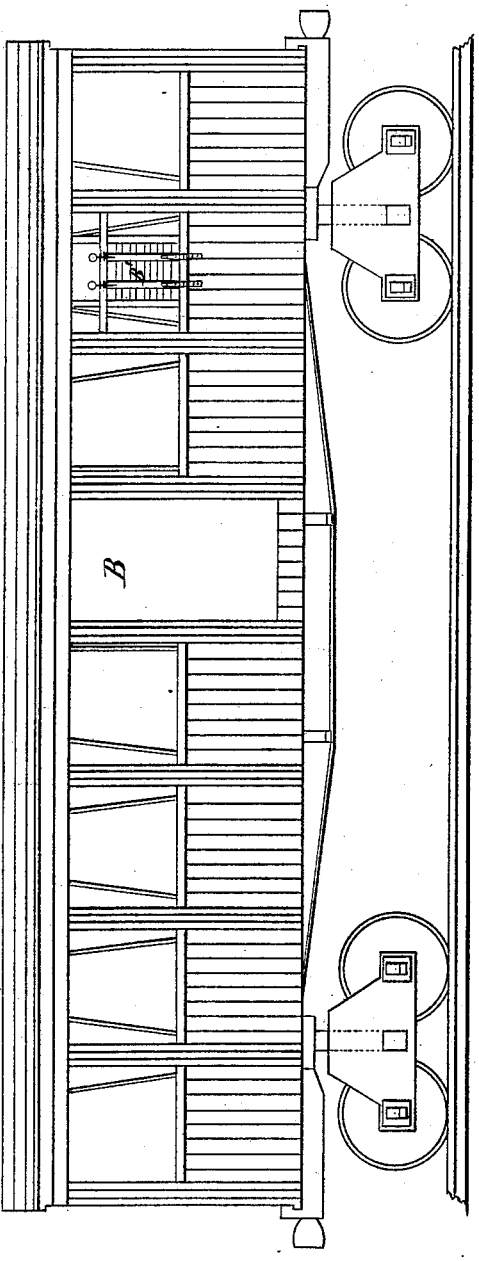
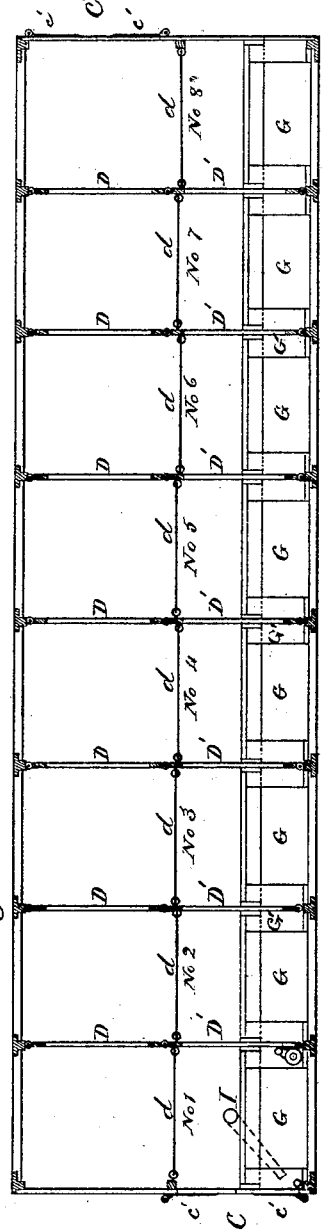
Witnesses
Tho Woodbridge
Harry Wells
Inventor
Cranstoun Cockburn Starke
By his Attorney
William Gill (No Model.) 2 Sheets—Sheet 2.
C. C. STARKE.
STOCK CAR.
No. 245,883. Patented Aug. 16, 1881.
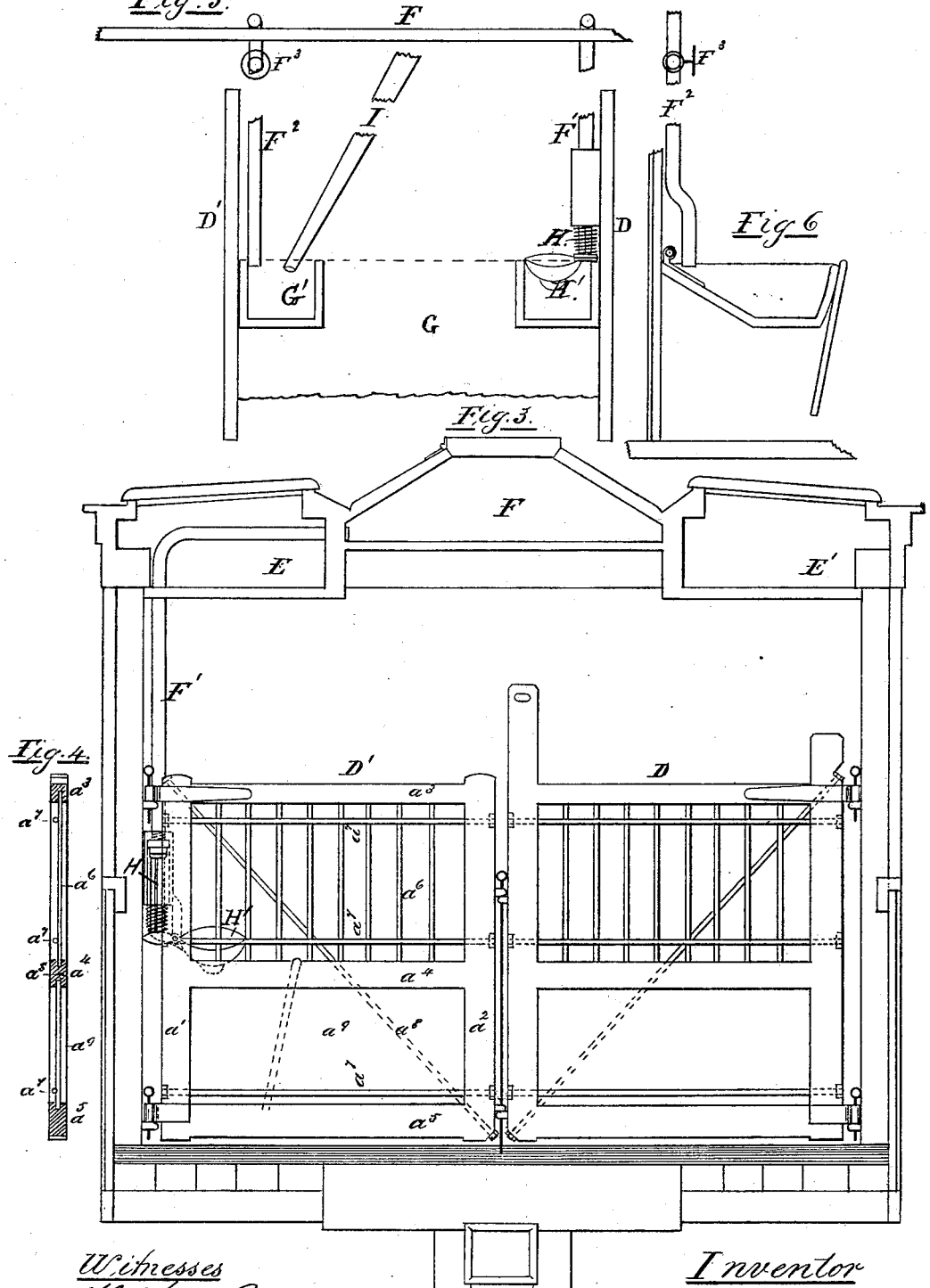
Witnesses
Thos Woodridge
Harry Wells
Inventor
Cranstoun Cockburn Starke
By his Attorney
William Gill

UNITED STATES PATENT OFFICE.

CRANSTOUN C. STARKE, OF TORONTO, ONTARIO, CANADA.

STOCK-CAR.

SPECIFICATION forming part of Letters Patent No. 245,883, dated August 16, 1881.

Application filed September 27, 1880. (No model.)

*To all whom it may concern:*

Be it known that I, CRANSTOUN COCKBURN STARKE, of the city of Toronto, in the county of York, in the Province of Ontario, Canada, have invented certain new and useful Improvements on Railroad-Cars; and I do hereby declare that the following is a full, clear, and exact description of the same.

My invention has for its object the prevention of abuse and cruelty to live stock during long journeys in railroad-cars to market, which, in consequence of overcrowding the animals, and without having any provision in the cars for the distribution and better arrangement of the cattle therein, results always in the deterioration and frequently in the loss of a number of the cattle from maltreatment therein.

By means of this invention I have provided a remedy for such abuses, by which the cattle will be able to undergo the fatigue of a long journey, and will suffer little, if any, injury therefrom.

My invention consists in the construction of a car which will give the cattle sufficient room to rest during the journey by apportioning them off in stalls, two cattle in each stall, which stalls will each be supplied with a manger for hay, feed-boxes for grain, and a pail for water, which latter article has an automatic apparatus for filling the same.

In the accompanying drawings the letters of reference indicate the parts named in this specification.

Figure 1 is a side elevation of the car, drawn to a scale of one-fourth inch to one foot. Fig. 2 is a plan in section, showing the various compartments, gates, stalls, and mangers, how the gates are hinged to the posts and to each other, and the longitudinal hinged brace-rods forming a continuous line from end to end of the car. Fig. 3 is a transverse section of car, drawn to a scale of three-fourths inch to one foot, showing one complete set of gates hinged to the posts of the car and to each other, and secured to the floor in the middle. This view shows the water and grain compartments as formed in the roof of the car. Figs. 4, 5, and 6 are enlarged detail views.

Returning to Fig. 1, A represents the car; B, the doors in the sides of the car, which are made to slide sidewise, and by which doors the cattle can be shipped and unshipped, if necessary, though preferably by the entrance-door in the end, as hereinafter described. In this view it will be observed that the second opening toward the right is fitted with a hinged door folding downward, and is sufficiently large for delivering hay into the mangers. This door is marked B', and is a sample of the other doors intended to be placed in the other similar openings of the car.

In Fig. 2, C represents the end door toward the left, and C' the end door toward the right, which latter is the entrance-door hereinbefore referred to. $c'$ $c'$ are the hinges thereof. D D represent the back half of gates, and D' D' the forward half thereof. $d$ $d$ are the hinged brace-rods, which connect the gates together longitudinally. G are the mangers; G', the feed-boxes; H' H', the water-supply pails; I I, the flexible spouts for spouting the grain to the feed-boxes G'.

Fig. 3 shows the grain-compartments E E', which run the entire length of the car. E contains the grain in bulk, and E' the grain in bags. F shows the water-compartment, which also runs the full length of the car; F', a water-supply pipe leading from compartment F to pail H in the front of the stall. This figure also shows the gates D and D', composed of the following parts: instile $a'$, outstile $a^2$, upper cross-bar, $a^3$, middle cross-bar, $a^4$, under cross-bar, $a^5$, upright iron bars $a^6$, transverse iron bars $a^7$, diagonal truss-rods $a^8$, and panel $a^9$.

Fig. 4 shows a vertical section of gate D, showing upper bar, $a^3$, middle bar, $a^4$, under bar, $a^5$, upright iron bars $a^6$, transverse iron bars $a^7$, diagonal truss-rods $a^8$, and panel $a^9$.

Fig. 5 shows the manger G and feed-boxes G' for grain; or, if the simple pipe $F^2$ be used, as shown on the left-hand side thereof, these boxes G' will be used for both grain and water; and if the water-pail H be used, as shown on the right-hand side of the stall, the feed-boxes will be used for grain only. All the stalls will be fitted up in the same manner. In Fig. 6 is shown a portion of a stall, showing an end view of feed-box G', hinged at the back end to turn up out of the way when hay is being used in the manger G. The hay will be supplied at certain stations, as previously arranged for by telegraph or otherwise. The grain will be carried on the cars in specially-constructed compartments, and spouted from said compartments into each of the feed-boxes at stated intervals of time, as required. The water will also be carried on the cars and in compartments specially constructed therefor, and run therefrom by a pipe and automatic-working valve leading to the water-pail aforesaid. The supply of water is obtained from the common supply-tank which fills the tank of the locomotive, all the cars of a train being filled simultaneously by having a short flexible pipe between each two cars. The water and grain compartments run the entire length of the car. In spouting the grain, one canvas tube (or wood, if hinged) will spout for the two feed-boxes in each stall, and in delivering the water two pails will be required, with pipe and valve to each, which are connected to the water-compartments aforesaid. The water and grain compartments are all constructed in the roof of the car, the water-compartment being in the middle and the grain-compartments on each side. The stalls are apportioned off by running seven double gates across the car, thereby dividing the car into eight compartments or stalls, which gates and the arrangement thereof form a chief feature of my invention. The gates are hinged to the posts at each side of the car by eyes and slide-pins, and in the middle to each other by similar eyes having one long slide-pin passing through two pairs of eyes and resting in a socket in the floor of the car, keeping the whole, with the longitudinal line of linked braces at the top, rigid and secure. The stalls are therefore thoroughly sufficient for the purpose of securing the cattle therein, and when the journey has been accomplished the car will be cleaned, rearranged by unhinging the gates in the middle and folding them against the sides of the car, which may be reloaded with ordinary freight for the return journey.

In describing more explicitly the water-supply to the stalls, it consists, first, of the water-compartment F in the roof of the car, into which sixteen (16) water-pipes, F', are inserted—one for each of the cattle—which lead from said compartment F to the stalls, each pipe being provided with a valve, H, and spiral spring placed in the projecting portion of the valve-stem, with a disk on the lower end thereof, between which disk and the valve-chamber the spring acts in drawing down the valve H closely on its seat, the spring being sufficiently strong to bear the weight of the empty pail H'. The neck of said pail forms a lever, though of itself it is a small pail, with a bridge across its mouth to press upon the disk on the valve-stem and raise the valve, the neck aforesaid receiving the water, from which it flows into the main body of the pail H', which is hinged to a downwardly-projecting arm from the valve-chamber, and operated by the animal as described, this pail having a recess in the bottom, which contains a small quantity of water which the cattle cannot reach, and in trying to reach it they press down the pail and, elevating the lever, compress the spiral spring, which lifts the valve and fills the water-pail. The water could be delivered from the supply-compartment by other means than those hereinbefore described—viz., by using the feed-boxes for both grain and water, when a simple pipe with globe-valve leading from the water-compartment would answer the purpose. This would be an equivalent device to that hereinbefore described.

As heretofore stated, the car is constructed with a door in each end and one in each side, near the middle, and by one of the end doors the cattle enter, the door being placed so that the cattle, on entering, will pass along to the farthest stalls, filling them in succession until all are filled.

A more explicit description of shipping the cattle is as follows: A portable platform is placed at the end of the car, leading from the station-platform to the entrance-door of the car. The half-gates along that side are unhinged from the posts, and are swung around until at right angles with the other half-gate. This will shut up all the stalls except that one at the farthest end of the car. Cattle, on entering the car, have no other place open for them to go but into this one stall, and when fairly in the gate is swung around to its position and locked. The other stalls are filled in the same way. The cattle will now be found with their heads all in one direction. They can be tied up, as other cattle in their stables, and receive proper care and attention during the journey.

Having now described my invention, I claim—

1. A cattle-car provided with the double gates D D', each constructed and composed of the following parts: instile $a$, outstile $a^2$, upper cross-bars, $a^3$, middle cross-bars, $a^4$, under cross-bar, $a^5$, upright iron bars $a^6$, transverse iron bars $a^7$, diagonal truss-rods $a^8$, and panel $a^9$, as shown and described.

2. The water-supply pipe F', with automatic valve H, and pail H', the said pail hinged to a downwardly-projecting arm from the valve-chamber, as shown and described, and operating as set forth.

3. The combination, with the car A, of the gates D D', water-compartment F, grain-compartments E E', water-supply pipe F', valve H, pail H', spout I, manger G, feed-boxes G', and longitudinal braces $d$, as shown and described, and operating as set forth.

4. The water-delivery pipe F², with globe-valve F³, for delivering water in the feed-boxes G' when required, in combination with the gates D D', water-compartment F, grain-compartments E E', water-supply pipe F', valve H, pail H', spout I, manger G, feed-boxes G', and longitudinal braces $d$, as shown and described.

CRANSTOUN COCKBURN STARKE.

Witnesses:
 WILLIAM GILL,
 THO. WOODBRIDGE.